United States Patent [19]

Lindquist

[11] 4,263,944
[45] Apr. 28, 1981

[54] METHOD AND APPARATUS FOR EMPTYING CATALYST PARTICLES FROM CATALYTIC CONVERTER

[75] Inventor: Craig B. Lindquist, Warren, Mich.

[73] Assignee: Kent-Moore Corporation, Warren, Mich.

[21] Appl. No.: 74,986

[22] Filed: Sep. 13, 1979

[51] Int. Cl.³ .............................................. B65B 1/16
[52] U.S. Cl. .......................................... 141/1; 141/67; 406/137; 406/145; 422/177; 422/232
[58] Field of Search ............... 422/177, 178, 219, 232; 406/137, 145, 151, 197, 198; 141/67, 8, 1

[56] References Cited

U.S. PATENT DOCUMENTS

| | | | |
|---|---|---|---|
| 2,673,125 | 3/1954 | Squire | 406/137 |
| 3,184,291 | 5/1965 | Calvert | 422/177 |
| 3,186,804 | 6/1965 | Fisher | 141/67 X |
| 3,295,565 | 1/1967 | Grandy | 141/67 |
| 3,964,528 | 6/1976 | Smithson et al. | 141/67 |

*Primary Examiner*—James L. Rowland
*Attorney, Agent, or Firm*—Burton, Parker & Schramm

[57] ABSTRACT

A method for emptying a catalytic converter where a container is attached to the fill hole of the converter such that a nozzle attached to an air line is inserted within the bed area of the converter. A vacuum source is turned on inducing negative pressure within the container and an air line is attached to the nozzle. The negative pressure results in a first air flow for carrying pellets from the bed area into the container while the air line passes through the nozzle in a jet stream of air and dislodges any particles remaining in the bed area so that they may flow into the container along with the first stream of air.

An apparatus for performing the above described method is also described.

6 Claims, 5 Drawing Figures

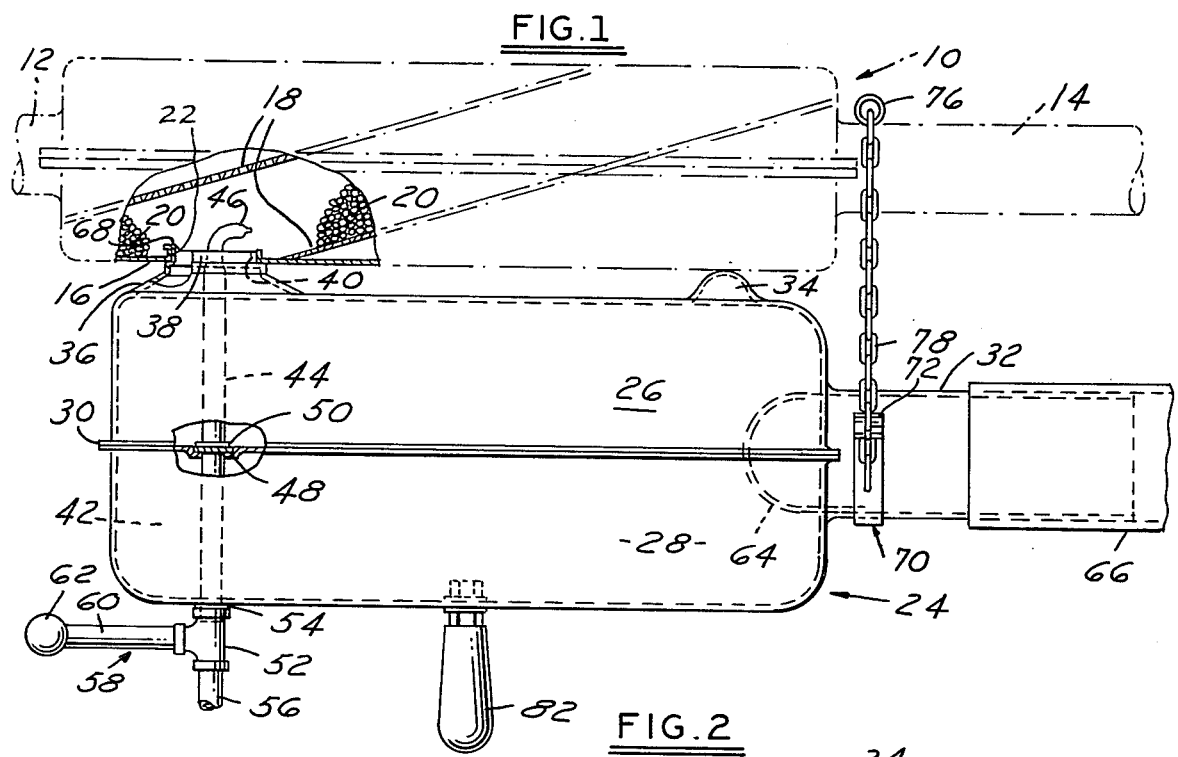
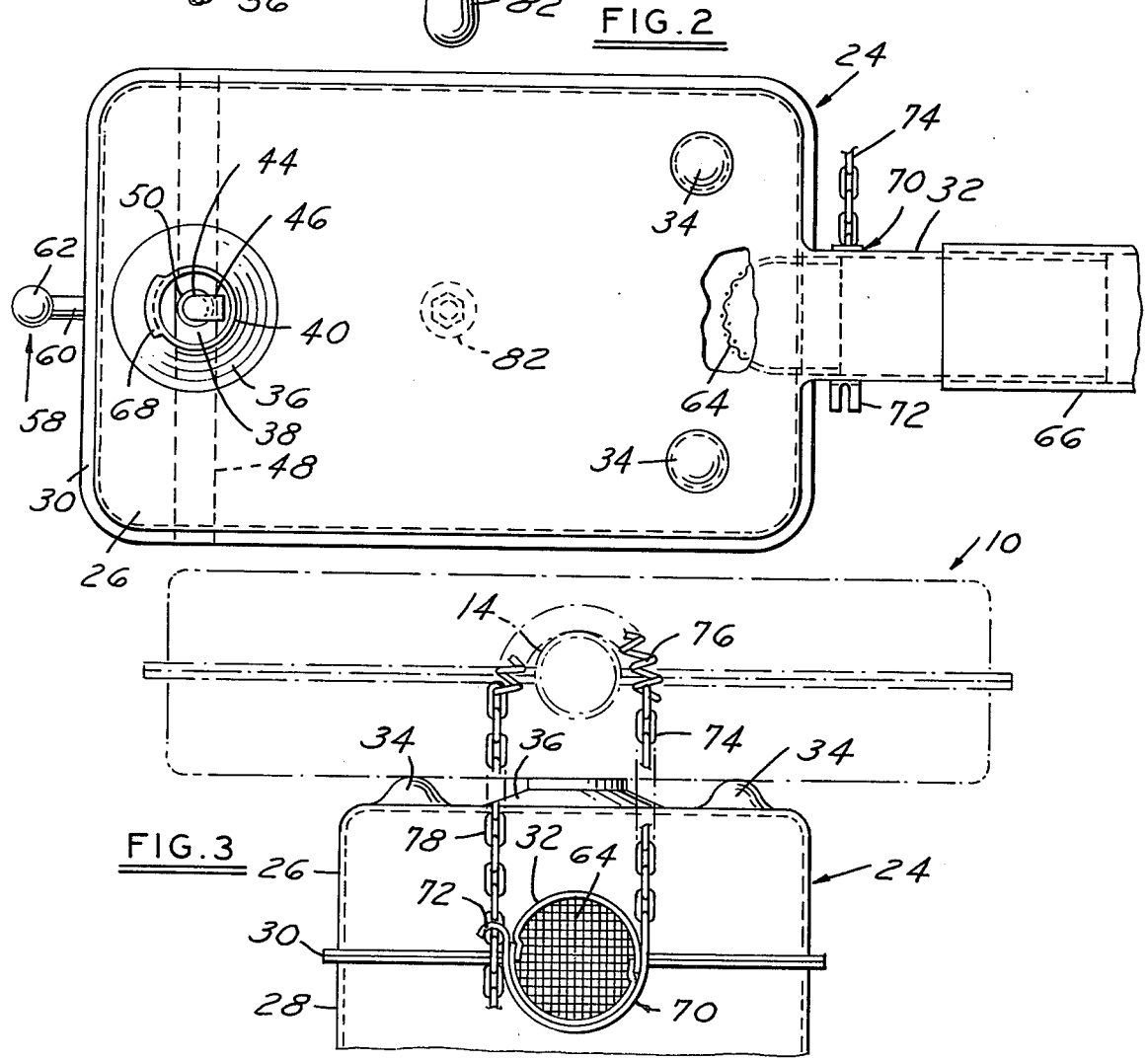

METHOD AND APPARATUS FOR EMPTYING CATALYST PARTICLES FROM CATALYTIC CONVERTER

DESCRIPTION

Background of the Invention

Concern for the environment has resulted in the automotive industry adopting exhaust purifiers using catalysts. One type of exhaust purifier or catalytic converter, as they are often called, takes the form of a number of beads or catalyst particles in a bed through which the exhaust must pass before entering the environment. Passage through this bed of particles purifies the air, thus benefiting the environment.

At times it is desired to empty the catalyst pellets from the purifier. A number of systems have been used in the past to empty purifiers. Normally, the systems require some method of vibrating the purifier so to insure that any pellets in the bed are shaken loose so that they may be emptied.

SUMMARY OF THE INVENTION

A primary object of the present invention is to provide a system for emptying or discharging the catalytic pellet bed area of the exhaust purifier of an internal combustion engine without the necessity of vibrating the purifier while insuring substantially complete removal of the pellets.

The catalyst discharger of the invention has a container for collecting the pellets extracted from the bed area of the purifier and also includes means for applying negative pressure to the container. Means are included for introducing a first stream of air into the purifier when that container is connected to the fill hole. This means is for dislodging particles within the bed area so that they may enter a second flow of air being drawn into the collector by the negative pressure.

A method of emptying a catalyst exhaust purifier is also described. Its steps include connecting a collector to the fill hole of the purifier and creating a first stream of air from the purifier into the collector through the fill hole. This flow of air is for pulling particles into the collector from the bed area. Dislodging of particles in the bed area by means of a second stream of air introduced into the purifier is also part of this method.

BRIEF DESCRIPTION OF THE DRAWINGS

FIG. 1 shows a side view of a discharger embodying the invention attached to the catalytic exhaust purifier partially cut away.

FIG. 2 shows a top view partially cut away of the discharger.

FIG. 3 shows an end view of the discharger and purifier.

DESCRIPTION OF PREFERRED EMBODIMENTS AND METHOD

Figure 4:
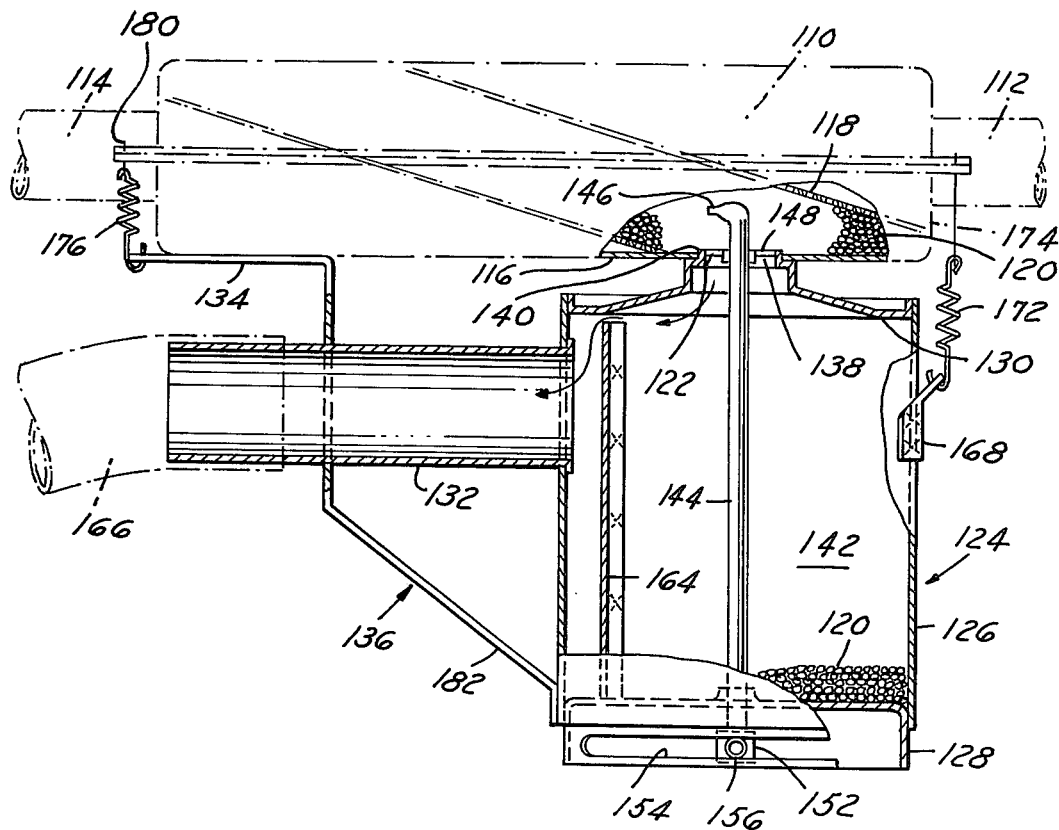
FIG. 4 shows a side view of another embodiment of the invention attached to a purifier partially cut away.

The invention is to be used with a catalyst exhaust purifier 10 of an internal combustion engine. The purifier has an inlet 12 from the engine and an exhaust pipe 14. The housing 16 of the purifier contains a bed area 18 in which catalyst particles 20 are normally tightly packed. Through the housing there is a fill hole 22 communicating with the bed area.

The first embodiment of the invention as shown in FIGS. 1-3 comprises a body 24 having an upper body portion 26 and a lower body portion 28 which are joined along flange 30. From one end of the body extends a pipe 32. The discharger includes means of positioning it against a purifier. In the first embodiment this takes the form of a pair of dimples 34 and a raised portion 36. There is a port 38 passing through the raised portion which has a neck 40 which fits in fill hole 22 so to allow travel of the particles from the bed area to the holding area 42.

Also passing through the fill hole 22 is air tube 44. Above the container body 24, this tube curves and terminates at nozzle 46. The air tube is positioned through the center of the port by support 48. The other end of the air tube passes through the holding area 42 and exits through the lower body portion 28. The air tube is prevented from vertical movement by washer 50 above the tube support and air line connector 52 below the lower body portion. Between the lower body portion and the air line connector, gasket 54 is positioned. The air line connector takes the form of a tee with one arm of the tee connected to the air tube, the second arm connected to an air line 56 and the base of the tee connected to the air flow director 58 comprising a stem 60, a non-heat conductive knob 62. Support of the air tube in this manner enables the nozzle to pivot a full 360 degrees by movement of the air flow director.

At the interior end of pipe 32, is placed a perforated cup shaped baffle 64. This baffle allows passage of air through it but prevents the catalyst particles from entering the pipe. The other end of the pipe allows attachment of hose 66 from a vacuum or negative pressure creating means (not shown). This vacuum source should not expose the air flow to any potential spark source.

Attachment means to the purifier are provided. At the front end attachment is accomplished by a lip 68 on neck 40. This lip is adapted to overlie a portion of the housing surrounding fill hole 22. Also provided as part of the attachment means is bracket 70 on pipe 32, one end of which is formed into a depending hook 72 while the other end is connected to chain 74. This chain in turn is connected to spring 76. The other end of spring 76 is attached to a second chain 78. This chain and spring combination allows for support of the discharger over exhaust pipe 14 when chain 78 is held by hook 72.

To empty the purifier of its catalyst particles, the following procedure is used. This is described in terms of equipment normally available in auto shop. The car would first be placed on a hoist with means to apply negative pressure within the exhaust system placed on the end of the tail pipe. Negative pressure application means can take the form of a vacuum source, such as an aspirator or a vacuum hose leading to an air vacuum pump. At this point the car is raised on the hoist. With the vacuum source on, the fill hole of the purifier is opened. The negative pressure in the exhaust system prevents catalyst particles from falling out of the open fill hole. The discharge unit is now connected to the purifier. First, the tube end of the discharge unit is tilted down enough to hook lip 68 into the fill hole of the purifier. Then the tube end is lifted until dimples 34 abut the bottom of the purifier and chain 78 is looped over exhaust pipe 14. The chain is pulled tight and attached to hook 72. At this point, the negative pressure application means are removed from the exhaust tail pipe.

The hose 66 of the negative pressure system is attached to pipe 32 of the discharge unit. The vacuum source is started again with the pipe applying negative pressure to the container. Air flows into the exhaust tail pipe and backwards through the exhaust system through the purifier, through the fill hole and then to the container of the discharge unit in response to the negative pressure. This air flow will cause a small amount of catalyst particles to move into the container. An air line 56 is attached to tee 52 and turned on. This air flow moves out through nozzle 46 in a jet stream into the purifier stirring up and dislodging the remaining catalyst particles so that they enter the air stream caused by the negative pressure and are carried into the container. The handle 58 attached to the air tube is swept back and forth so that all areas of the purifier are subjected to the air blast. The sweeping of the purifier should continue approximately two minutes for complete removal of the particles. It should be noted that the particles can be very hot and thus the body of the container may also become very hot. For this reason, the only contact with the discharge unit by the person emptying the tube would be through knob 62 and handle 58. After collection of the particles, hose 66 should be removed along with air line 56. Chain 78 is unhooked and the container is removed from the fill hole.

Figure 5:
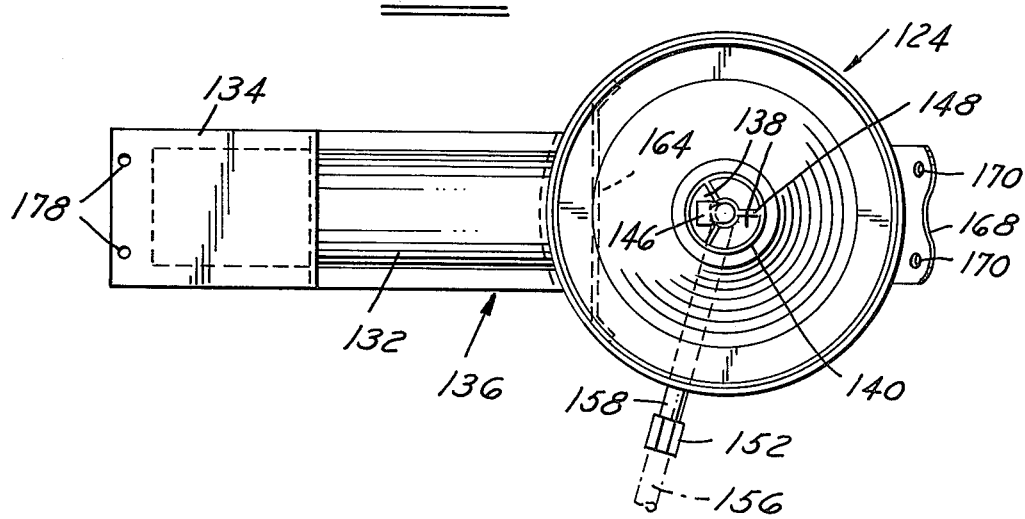
FIG. 5 shows a top view of the second embodiment of the discharger.

A second embodiment of the collector is shown in FIGS. 4 and 5. The catalyst exhaust purifier 110 shown in FIG. 4 has the basic features of an inlet 112, an exhaust pipe 114 and a housing 116 with a flange 117. In the purifier is a bed area 118 in which catalyst particles 120 are normally packed. There is a fill hole 122 through the housing communicating with the bed area.

The container 124 of this embodiment features a tubular body 126 into which is fitted base 128. The top of the body is covered with top portion 130. Off one side of the body extends tube 132.

The discharge unit is positioned against the purifier by position means including the positioning plate portion 134 of an irregularly shaped member 136 and neck 140 around port 138. Neck 140 is adapted for positioning in the fill hole. The port allows pellets 120 to move from the bed area 118 to a holding area 142 in the container.

Through the center of the container there is an air tube 144 which is basically L-shaped having at its top a nozzle 146. The air tube passes through the port of the container so that when the container is positioned against the purifier, the nozzle is positioned within the bed area of the purifier. The air tube is held in place in the center of the container by a support 148 across the top of the port and by a hole through the base 128. The air tube is pivotable in the support and base. At one end of the air tube, there is an air line connector 152 which allows an air line 156 to be joined to the air tube 144. The lower portion 158 of the L-shaped air tube passes through a slot 154 in base 128. This prevents vertical movement of the air tube relative the container, but permits the air tube to be pivoted by movement of the L-shaped portion along this slot. Thus, nozzle 146 can be pointed in different areas of the purifier. Positioned within the container is a baffle 164 extending substantially to the top of the container, although a space is allowed for air flow over the top of the baffle. This baffle is solid and is positioned in front of though spaced from tube 132. Vacuum tube 166 may be positioned over the free end of tube 132.

To hold the container 124 securely against the purifier 110, an anchor plate 168 with a pair of holes 170 is attached to one side of the container. Hooked springs 172 are placed in each hole and connected to hooked extensions 174. The extensions are supported on flange 117 of the purifier. At the other end of the purifier, a container is held against the purifier by placing additional hooked springs 176 in holes 178 of the positioning plate 134. These are likewise secured to the flange 117 of the purifier by hooks 180.

During use of the container it may be held by a portion 182 of member 136 which is designed to be used as a handle.

In operation, this embodiment works along the same lines of the previous embodiment. Again, negative pressure inducing means are attached to the exhaust pipe 114 holding the pellets in place while the container is secured to the purifier. After the container is positioned and secured, the hose 166 from means for generating negative pressure (not shown) is placed over tube 132, thereby applying negative pressure to the container when the generating means is turned on. This pulls pellets from the purifier into the container holding area 142 due to the resultant air flow. Air line 156 is attached air tube 158. A jet of air is blasted into the purifier shaking any remaining pellets loose so that they would now be caught in the air flow induced by the negative pressure and travel into the container. As with the other embodiment, air tube 144 should be pivoted back and forth for a period of approximately two minutes to insure that substantially all pellets are blasted loose from the bed area.

I claim:

1. A catalyst particle discharger for a catalytic exhaust purifier having a housing containing a bed area normally filled with catalyst particles and having a full hole communicating with the bed area, said discharger comprising:
    a container for collecting particles extracted from the bed area of the purifier and having a port to allow connection of the collector with the fill hole;
    means for applying negative pressure to the container; and
    blasting means comprising a tube passing through the port for introducing a first stream of air into the purifier when the port is connected to the fill hole for dislodging particles which enables them to enter a second stream of air being drawn into the collector by the negative pressure applied to the container.

2. The discharger of claim 1 wherein the blasting means further comprises a nozzle at the top of the tube for directing the air and means for pivoting the tube and nozzle.

3. The discharger of claim 2 further comprising a baffle for prevent particles from entering the means for applying negative pressure.

4. The discharger of claim 3 wherein the means for applying negative pressure comprises a tube and the baffle comprises a perforated screen enclosing the tube.

5. The method for emptying catalyst particles from a catalystic exhaust purifier having a housing containing a catalyst bed area holding said particles and having a fill hole communicating with said bed area comprising the steps:
    connecting a collector to the fill hole;

creating a first stream of air from the purifier to the collector through the fill hole to carry particles into the collector from the bed;

dislodging particles in the bed area by means of a second stream of air introduced in the purifier causing them to enter the first stream and thereby be carried from the purifier to the collector; and directing the second stream of air to different areas of the purifier by turning a tube by which the second stream of air is introduced into the purifier.

6. The method of claim 5 wherein the first stream of air is created by inducing negative pressure in the collector.

* * * * *

UNITED STATES PATENT OFFICE
CERTIFICATE OF CORRECTION

Patent No. 4,263,944      Dated April 28, 1981

Inventor(s) Craig B. Lindquist

It is certified that error appears in the above-identified patent and that said Letters Patent are hereby corrected as shown below:

In column 4, line 38, delete "full" and insert -- fill ---.

Signed and Sealed this

Eighteenth Day of August 1981

[SEAL]

Attest:

Attesting Officer

GERALD J. MOSSINGHOFF

Commissioner of Patents and Trademarks